United States Patent
Kadu (10) Patent No.: US 12,425,567 B2
(45) Date of Patent: *Sep. 23, 2025

(54) SYSTEM AND METHOD FOR ENCODING IMAGE

(71) Applicant: Samsung Display Co., Ltd., Yongin-si (KR)

(72) Inventor: Harshad Kadu, San Jose, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 162 days.

This patent is subject to a terminal disclaimer.

(21) Appl. No.: 18/151,377

(22) Filed: Jan. 6, 2023

(65) Prior Publication Data
US 2024/0146901 A1   May 2, 2024

Related U.S. Application Data (60) Provisional application No. 63/421,034, filed on Oct. 31, 2022.

(51) Int. Cl.
| | | |
|---|---|---|
| *H04N 19/102* | (2014.01) | |
| *H04N 19/182* | (2014.01) | |
| *H04N 19/423* | (2014.01) | |

(52) U.S. Cl.
CPC ......... *H04N 19/102* (2014.11); *H04N 19/182* (2014.11); *H04N 19/423* (2014.11)

(58) Field of Classification Search
CPC ... H04N 19/102; H04N 19/182; H04N 19/423
USPC .................................................. 375/240.02
See application file for complete search history.

(56) References Cited

U.S. PATENT DOCUMENTS

| | | |
|---|---|---|
| 6,026,217 A | 2/2000 | Adiletta |
| 7,295,608 B2 | 11/2007 | Reynolds et al. |
| 8,311,095 B2 | 11/2012 | Brown et al. |
| 9,762,911 B2 | 9/2017 | Puri et al. |
| 9,794,563 B2 | 10/2017 | Sato et al. |
| 9,883,198 B2 | 1/2018 | Puri et al. |
| 10,313,693 B2 | 6/2019 | Fan et al. |
| 10,547,852 B2 | 1/2020 | Chan et al. |

(Continued)

FOREIGN PATENT DOCUMENTS

| | | |
|---|---|---|
| WO | 2020131891 A1 | 6/2020 |
| WO | 2021107965 A1 | 6/2021 |

OTHER PUBLICATIONS

Hwang, Y-T. et al., "A Low-Complexity Embedded Compression Codec Design With Rate Control for High Definition Video", IEEE Transactions on Circuits and Systems for Video Technology, 2014, pp. 674-687, vol. 25, No. 4, IEEE.

(Continued)

*Primary Examiner* — Jessica M Prince
(74) *Attorney, Agent, or Firm* — Lewis Roca Rothgerber Christie LLP (57) ABSTRACT

A system and method for encoding an image. The method includes: encoding a first pixel of an image using a first codec; selecting, based on a remaining bit budget, a second codec; encoding a second pixel, immediately following the first pixel, using the second codec, wherein: the first codec has a first loss, according to a measure of loss; and the second codec has a second loss, according to the measure of loss, the second loss being greater than zero and less than the first loss.

20 Claims, 5 Drawing Sheets

| Codecs | Remaining Bits Per Subpixel |
|---|---|
| Lossless | > 2.5 |
| Lossy Codec 1 | > 2.0 && <= 2.5 |
| Lossy Codec 2 | <= 2.0 |

(56) References Cited

U.S. PATENT DOCUMENTS

| | | |
|---|---|---|
| 10,909,725 B2 | 2/2021 | Mammou et al. |
| 11,244,476 B2 | 2/2022 | Thirumalai |
| 11,409,998 B2 | 8/2022 | Mammou et al. |
| 2005/0038645 A1* | 2/2005 | Mabey ................. H04N 19/176 704/215 |
| 2010/0142761 A1* | 6/2010 | Venkatapuram ....... H04N 19/43 382/107 |
| 2016/0014413 A1 | 1/2016 | Sato |
| 2021/0312666 A1* | 10/2021 | Thirumalai .......... H04N 19/176 |

OTHER PUBLICATIONS

Pearlman, W. A. et al., "Efficient, Low-Complexity Image Coding With a Set-Partitioning Embedded Block Coder", IEEE Transactions on Circuits and Systems for Video Technology, Nov. 2004, pp. 1219-1235, vol. 14, No. 11, IEEE.

* cited by examiner

| Codeword Range | Binary Representation | |
|---|---|---|
| | Prefix | Suffix |
| 0 | 0 | - |
| [1,2] | 1 | x |
| [3,6] | 11 | xx |
| [7,14] | 111 | xxx |
| [15,30] | 1111 | xxxx |

FIG. 2A

| Codecs | Remaining Bits Per Subpixel |
|---|---|
| Lossless | > 2.5 |
| Lossy Codec 1 | > 2.0 && <= 2.5 |
| Lossy Codec 2 | <= 2.0 |

FIG. 2B

| Src | 11 | 8 | 15 | 8 | 10 | 5 | 15 | 14 | 1 | 9 |
|---|---|---|---|---|---|---|---|---|---|---|
| Residue | 11 | -3 | 7 | -7 | -5 | -6 | 8 | -1 | -14 | -2 |
| Rem Bits | 30 | 26 | 18 | 14 | 13 | 7 | 6 | 5 | 4 | 3 |
| Codec | LL | LL | L1 | L2 | L1 | L2 | L2 | L2 | L2 | LL |
| Bits Used | 4 | 8 | 4 | 1 | 6 | 1 | 1 | 1 | 1 | 6 |
| Rec | 11 | 8 | 15 | 15 | 11 | 7 | 15 | 15 | 7 | 9 |
| Error | 0 | 0 | 0 | 7 | 1 | 2 | 0 | 1 | 6 | 0 |

SYSTEM AND METHOD FOR ENCODING IMAGE

CROSS-REFERENCE TO RELATED APPLICATION(S)

The present application claims priority to and the benefit of U.S. Provisional Application No. 63/421,034, filed Oct. 31, 2022, entitled "OLBC RATE CONTROL", the entire content of which is incorporated herein by reference.

FIELD

One or more aspects of embodiments according to the present disclosure relate to encoding, and more particularly to variable rate encoding of video data.

BACKGROUND

In video processing systems, it may be advantageous to store video in compressed form to reduce memory requirements. Such compression may be performed one pixel at a time, or one subpixel at a time.

It is with respect to this general technical environment that aspects of the present disclosure are related.

SUMMARY

According to an embodiment of the present disclosure, there is provided a method, including: encoding a first pixel of an image using a first codec; selecting, based on a remaining bit budget, a second codec; encoding a second pixel, immediately following the first pixel, using the second codec, wherein: the first codec has a first loss, according to a measure of loss; and the second codec has a second loss, according to the measure of loss, the second loss being greater than zero and less than the first loss.

In some embodiments, the method further includes storing the result of the encoding of the first pixel in a buffer, wherein the remaining bit budget is the number of free bits in the buffer after the storing of the result, less a reserve amount.

In some embodiments, the selecting of the second codec includes determining that the estimated number of bits required to encode the remaining pixels of the image using the second codec is greater than or equal to the remaining bit budget.

In some embodiments: the selecting of the second codec includes determining that the estimated number of bits required to encode the remaining pixels of the image using a third codec is less than the remaining bit budget; and the third codec has a third loss, according to the measure of loss, the third loss being greater than the second loss.

In some embodiments, the method further includes encoding a third pixel using a fourth codec, wherein the fourth codec has a fourth loss, according to the measure of loss, the fourth loss being greater than the first loss.

In some embodiments, the measure of loss is a maximum loss.

In some embodiments, the measure of loss is an average loss.

According to an embodiment of the present disclosure, there is provided a method, including: encoding a first pixel of an image using a first codec; encoding a second pixel of an image using a second codec; selecting, based on a remaining bit budget, a third codec; encoding a third pixel, immediately following the second pixel, using the third codec, wherein: the first codec has a first loss, according to a measure of loss; the second codec has a second loss, according to the measure of loss; the third codec has a third loss, according to the measure of loss; the first loss is greater than the second loss; and the third loss is greater than the first loss.

In some embodiments, the method further includes storing the result of the encoding of the second pixel in a buffer, wherein the remaining bit budget is the number of free bits in the buffer after the storing of the result, less a reserve amount.

In some embodiments, the selecting of the third codec includes determining that the estimated number of bits required to encode the remaining pixels of the image using the third codec is greater than or equal to the remaining bit budget.

In some embodiments: the selecting of the third codec includes determining that the estimated number of bits required to encode the remaining pixels of the image using a fourth codec is less than the remaining bit budget; and the fourth codec has a fourth loss, according to the measure of loss, the fourth loss being greater than the third loss.

In some embodiments, the method further includes encoding a fourth pixel using a fourth codec, wherein the fourth codec has a fourth loss, according to the measure of loss, the fourth loss being greater than the first loss.

In some embodiments, the measure of loss is a maximum loss.

In some embodiments, the measure of loss is an average loss.

According to an embodiment of the present disclosure, there is provided a method, including: encoding a first pixel of an image using a first codec; selecting, based on a remaining bit budget, a second codec; encoding a second pixel, immediately following the first pixel, using the second codec, wherein: the first codec has a first loss, according to a measure of loss; the second codec has a second loss, according to the measure of loss, the second loss being less than the first loss; and the second pixel follows a first pixel of a line of the image and precedes a last pixel of the line of the image.

In some embodiments, the method further includes storing the result of the encoding of the first pixel in a buffer, wherein the remaining bit budget is the number of free bits in the buffer after the storing of the result, less a reserve amount.

In some embodiments, the selecting of the second codec includes determining that the estimated number of bits required to encode the remaining pixels of the image using the second codec is greater than or equal to the remaining bit budget.

In some embodiments: the selecting of the second codec includes determining that the estimated number of bits required to encode the remaining pixels of the image using a third codec is less than the remaining bit budget; and the third codec has a third loss, according to the measure of loss, the third loss being greater than the second loss.

In some embodiments, the method further includes encoding a third pixel using a fourth codec, wherein the fourth codec has a fourth loss, according to the measure of loss, the fourth loss being greater than the first loss.

In some embodiments, the measure of loss is a maximum loss.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for encoding provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1A:
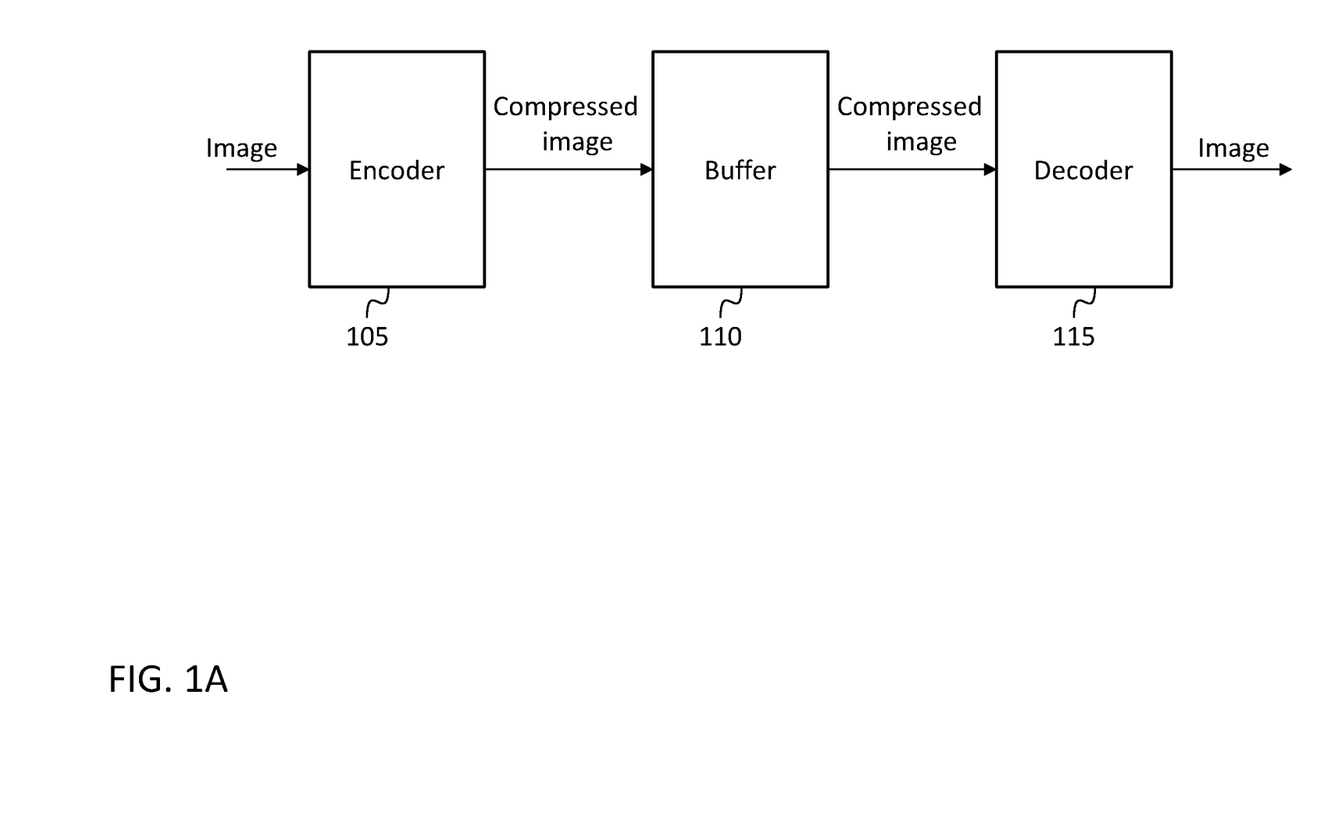
FIG. 1A is a block diagram of a system for storing an image in compressed form, according to an embodiment of the present disclosure.

In a system in which video data is processed, it may be advantageous to encode (e.g., to compress) the video data. For example, a video data processing system may perform processing of a current frame of video using video data of both the current frame and the previous frame; in such a system the previous frame may be stored in compressed form to reduce the size of the memory required to store it. FIG. 1A shows a system for temporarily storing an image in compressed form. The image is fed to an encoder 105, which encodes the image to form a compressed image. The compressed image is stored in a buffer 110. When the image is subsequently needed, it is read from the buffer 110, and decompressed by a decoder 115. Each of the encoder 105 and the decoder 115 may be (or may be part of, or may be implemented in) a processing circuit (discussed in further detail below).

A frame of video may consist of an array of pixels, each of which may include a plurality of subpixels (e.g., a pixel may include a red subpixel, a green subpixel, and a blue subpixel). When a frame of video is encoded one subpixel at a time, it may be the case that the amount of storage space required to store the encoded frame is not known when encoding begins, because the number of bits required to encode any given subpixel using a given encoder may vary from subpixel to subpixel. As such, if the amount of space available (e.g., in a buffer 110) for storing the encoded frame is fixed, different encoders may be used, as the encoding progresses, to ensure that the compressed frame will fit into the buffer.

For example, at various points in the process as the encoding progresses, a "codec" (coder-decoder) may be selected from among a plurality of codecs, each of the codecs requiring, on average, a different number of bits to encode a subpixel. Generally, the fewer the bits a codec uses per encoded subpixel, the more lossy it is (i.e., the greater the expected discrepancy between (i) the original subpixel and (ii) a subpixel that is encoded and then decoded with the codec). As such, using a lower-loss codec may generally result in higher quality processed video, and may consume more storage space. If the amount of space remaining in the buffer is relatively small relative to the amount of the frame remaining to be encoded, then a codec that uses relatively few bits per subpixel may be used (to avoid running out of space); if the amount of space remaining in the buffer is relatively large relative to the amount of the frame remaining to be encoded, then a codec that uses relatively many bits per subpixel may be used, to avoid needlessly degrading the quality of the video.

Figure 1B:
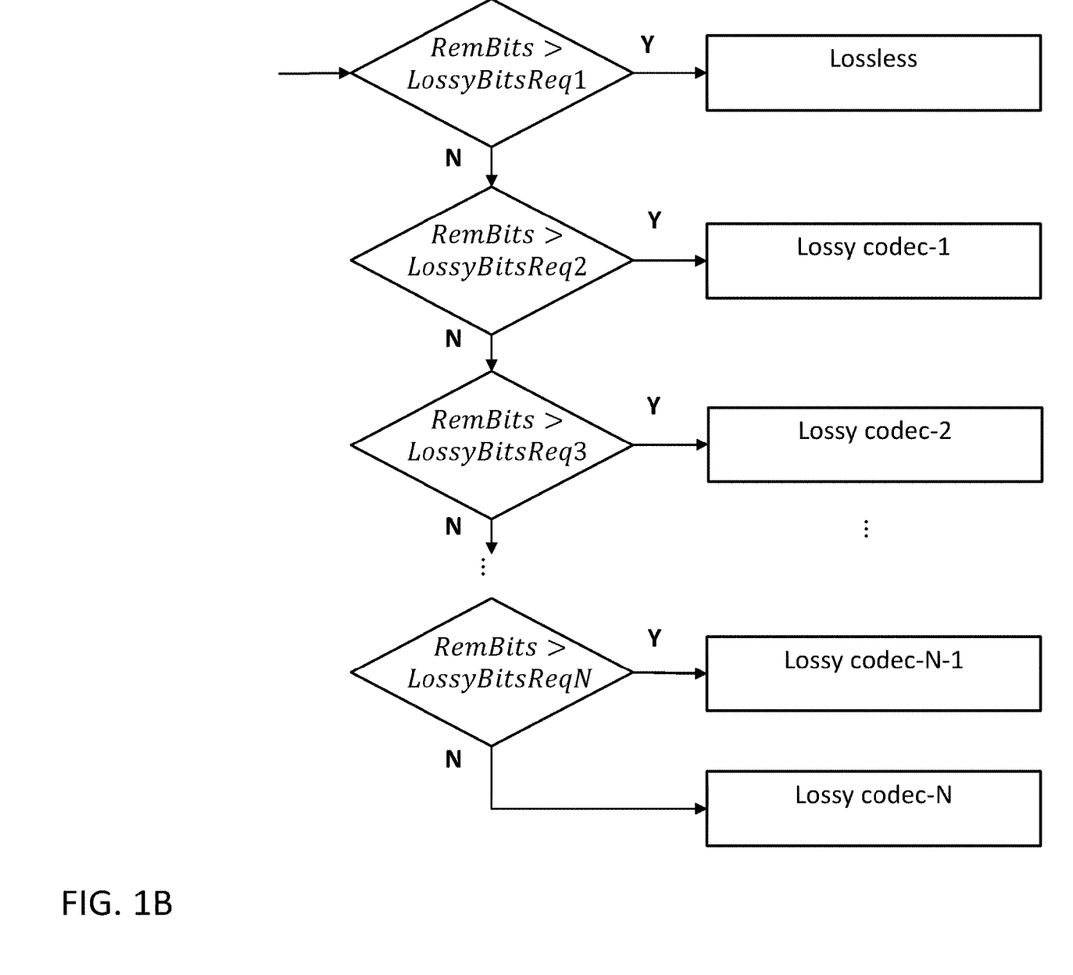
FIG. 1B is a flow chart of a decision tree, according to an embodiment of the present disclosure.

A decision tree for a system for performing variable rate encoding is illustrated in FIG. 1B. The system includes N+1 codecs, including a lossless codec and N lossy codecs. The lossy codecs are numbered in order of loss, according to a measure of loss (discussed in further detail below), with codec j having greater loss than codec j−1 (the lossless codec may be referred to as codec 0). In FIG. 1B, codec j is labeled "Lossy codec-j" except for codec 0, which is labeled "Lossless". In FIG. 1B, "RemBits" is the number of bits remaining to encode the remaining subpixels. This number may be less than the remaining space in the buffer by a reserve amount (discussed in further detail below). In FIG. 1B, "LossyBits-Reqj" is the expected number of bits required to encode the remaining subpixels with codec j. This number may be calculated as the product of (i) the number of subpixels remaining to be encoded and (ii) the average number of bits per subpixel for codec j (averaged over all possible subpixel values). The decision tree of FIG. 1B has the effect of choosing, for each subpixel, the lowest-loss codec for which the next-higher-loss codec is expected to encode the remaining subpixels with space to spare, i.e., using fewer than the number of bits remaining. The decision tree may be used for each subpixel, to select the codec to be used for encoding that subpixel.

The codec used may use, for example, entropy coding (e.g., Huffman coding or arithmetic coding), or exponential Golomb coding. At each subpixel (except the first) the value that is encoded may be the difference (or "residual") between the value of the present subpixel and the previous subpixel.

Figure 2A:
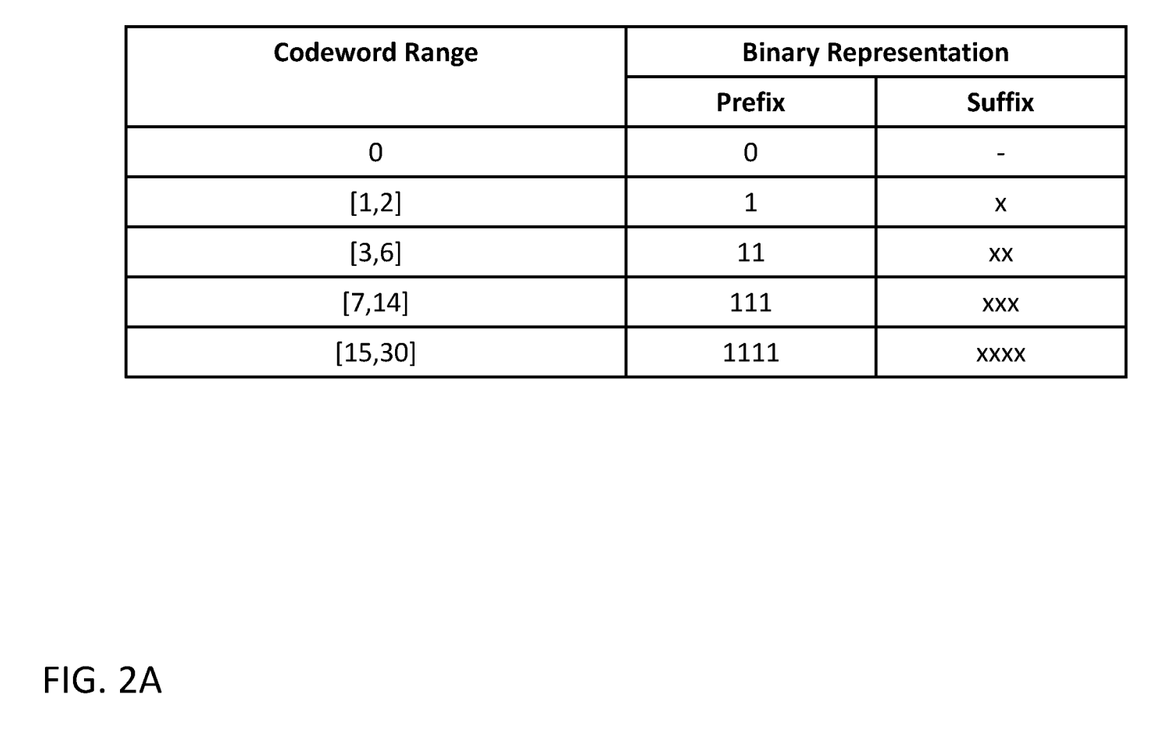
FIG. 2A is an encoding table, according to an embodiment of the present disclosure.

FIG. 2A shows a coding table for a lossless codec using exponential Golomb coding. If the codeword (the residual) is zero, then the subpixel is encoded using one bit, having the value 1. If the codeword (the residual) is in the range [1, 2] (i.e., it is 1 or 2), then the subpixel is encoded using two bits, the first bit having the value 1 and the second bit indicating whether the value of the codeword is 1 or 2. If the codeword (the residual) is in the range [3, 6] (i.e., it is 3, 4, 5, or 6), then the subpixel is encoded using four bits, the first two bits having the (binary) value 11 and the remaining two bits indicating whether the value of the codeword is 3, 4, 5, or 6. Similarly, if the codeword (the residual) is in the range [7, 14] then the subpixel is encoded using six bits, the first three bits having the (binary) value 111 and the remaining three bits indicating which value, in the range [7, 14], the codeword has. If the codeword (the residual) is in the range [15, 30] then the subpixel is encoded using eight bits, the first four bits having the (binary) value 1111 and the remaining four bits indicating which value, in the range [15, 30], the codeword has. Lossy codecs may be constructed based on the codec of FIG. 2A by truncating one or more of the least significant bits from the codeword, and encoding the remaining bits using the lossless code of FIG. 2A.

Figure 2B:
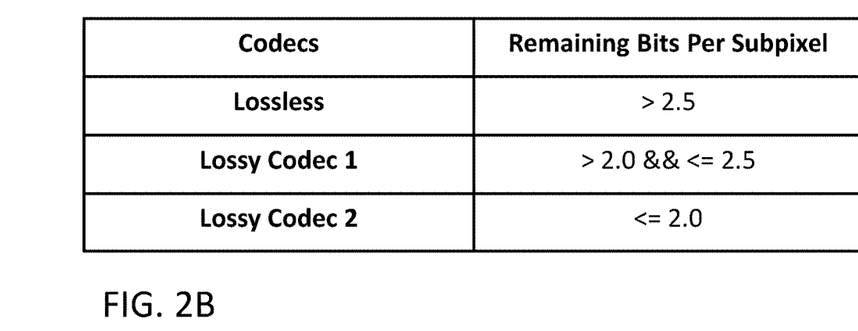
FIG. 2B is a decision table, according to an embodiment of the present disclosure.
Figure 2C:
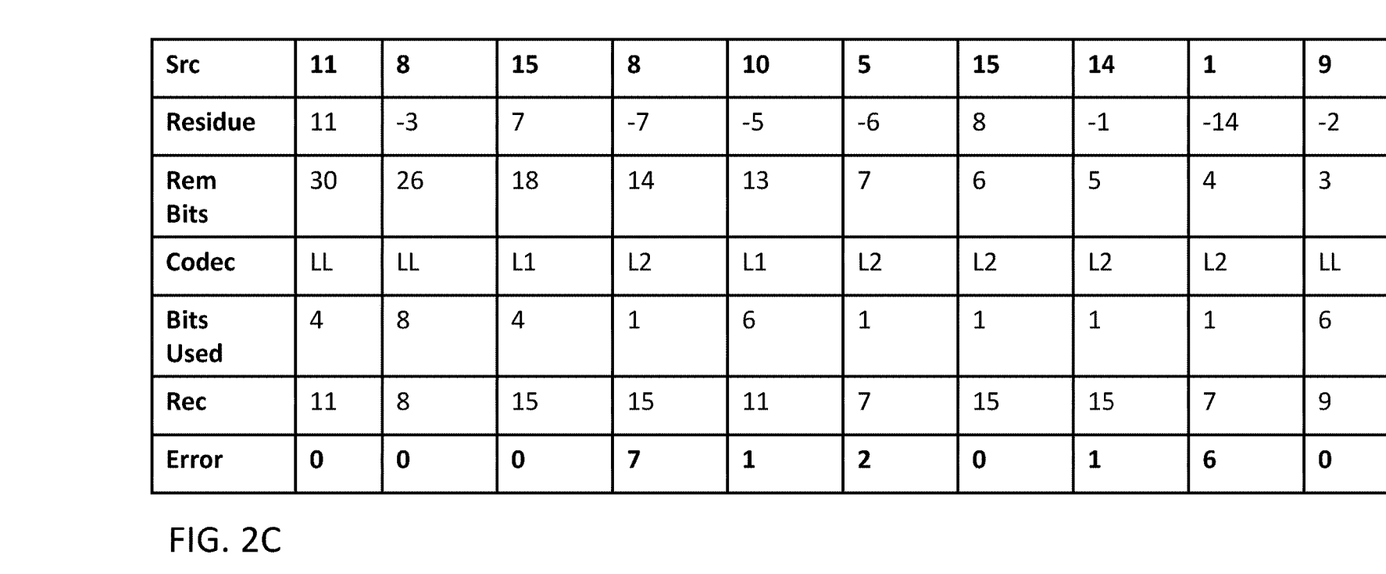
FIG. 2C is a diagram of an encoding sequence, according to an embodiment of the present disclosure.

FIG. 2B shows a decision table for a system with three codecs, in some embodiments. FIG. 2C shows the process and result of encoding an example of a sequence of subpixels, having the values 11, 8, 15, 8, 10, 5, 15, 14, 1, and 9, for a number of remaining bits that is initially 30, using the three codecs of FIG. 2B. At the first step, the subpixel value, and the residue (because the subpixel being encoded is the first subpixel), are both 11. The lossless codec is selected (using the decision table of FIG. 2B) because the number of remaining bits per subpixel is 30 bits/10 subpixels=3 bits per subpixel, which is greater than 2.5. In this example, the lossless codec uses 4 bits to encode the residue (11), the recovered value (Rec) when the encoded value is subsequently decoded is equal to the subpixel value, and the error (the difference between the original value and the recovered value) is zero (as it must be, because the lossless codec was used). Similarly, when the second subpixel (having a value 8) is encoded, the number of remaining bits per subpixel is 26 bits/9 subpixels=2.89 bits per subpixel, which is greater than 2.5. When the third subpixel is encoded, the number of remaining bits per subpixel is 18 bits/8 subpixels=2.25 bits per subpixel, and lossy codec 1 is used. Encoding proceeds in an analogous manner for the remaining subpixels. When the last subpixel is encoded, the number of bits remaining is 3, so the lossless codec is used.

The number of bits used to encode the last subpixel is 6, resulting in an "overflow" (a number of bits used that exceeds the number of bits remaining) of 3 bits. This may be acceptable (and the 3 excess bits may fit in the buffer, because of the reserve kept when defining the number of bits remaining. In general, because the number of bits required to encode any given subpixel is not known, the last encoding operation may use more bits than the number of bits remaining. To avoid being unable to store the excess bits in the buffer the number of remaining bits may be set equal to the amount of space remaining in the buffer less a reserve, the reserve being equal to the worst-case overflow.

The boundaries between encoded subpixel values may be inferred during decoding by using the same decision table (e.g., the table of FIG. 2B) to identify the codec used for encoding.

The codecs in the system may be ranked by loss, according to a measure of loss. The measure of loss may be, for example, the maximum loss, or the average loss, over all of the values that each encoder is configured to encode. In such a definition, the loss may be the discrepancy between the original value (the value before encoding) and the value that results after encoding and decoding. Another possible measure of loss is a perceptual loss, which is the extent to which a viewer perceives two images as being different, or the extent to which a viewer perceives the quality of an image that has been encoded and decode to be inferior to the quality of the original image.

Figure 3:
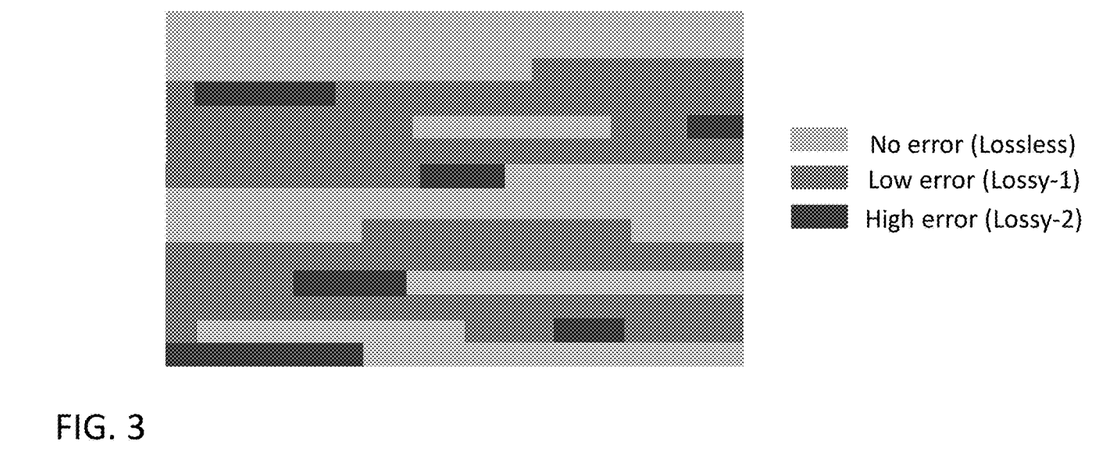
FIG. 3 is a diagram showing a distribution of codecs across an image, according to an embodiment of the present disclosure.

Some related art embodiments use three codecs, and enforce constraints on transitions between codecs. For example, the only allowed transition to a less lossy codec may be to the lossless codec, and this transition may only be permitted at certain transition points (e.g., at the end of a line of the frame). Transitions to more lossy codecs may be permitted at any subpixel, but such transitions may be constrained to changing to the next more lossy codec of the set of codecs (e.g., a transition directly from codec 0 to codec 2 may not be permitted). Compared to such a system, a system with a larger number of codecs, and without constraints on when, and to which codec, transitions may be made, may have several advantages. The reserve required for a system with fewer codecs and more constraints may be greater, because, for example, if, at the second-last subpixel the lossless codec is used, and the preferred codec for the last subpixel is codec 2, then using codec 1 (because of a constraint that any transition to a more lossy codec must be to the next-more-lossy codec) may result in a greater overflow. The constraints may also result in a larger average error. Moreover, less frequent transitions in codecs may cause the errors to be concentrated in relatively large sets of contiguous subpixels, causing image defects that may be more readily perceptible. FIG. 3 shows an example of the distribution of pixels in which each of three different codecs may be used, when the selection of codec is unconstrained. It may be seen that the regions in which codec 2 ("Lossy 2") is used, for example, are distributed over the image; this may result in relatively imperceptible image quality degradation.

In some embodiments, a system using unconstrained codec selection with more than three codecs may (i) transition between two lossy codecs, transitioning from a codec that is more lossy to one that is less lossy, (ii) use four or more codecs, (iii) transition from a first codec to a second codec, the second codec being two steps more lossy than the first codec (e.g., there being a codec intermediate, based on a measure of loss, between the first codec and the second codec), or (iv) transition between codecs at a point in the image that is not the end of a line. Such transitions may involve encoding a first subpixel with one encoder, and immediately thereafter encoding a second subpixel with another encoder ("immediately" signifying that no other subpixels are encoded between the encoding of the first subpixel and the second subpixel).

Figure 4:
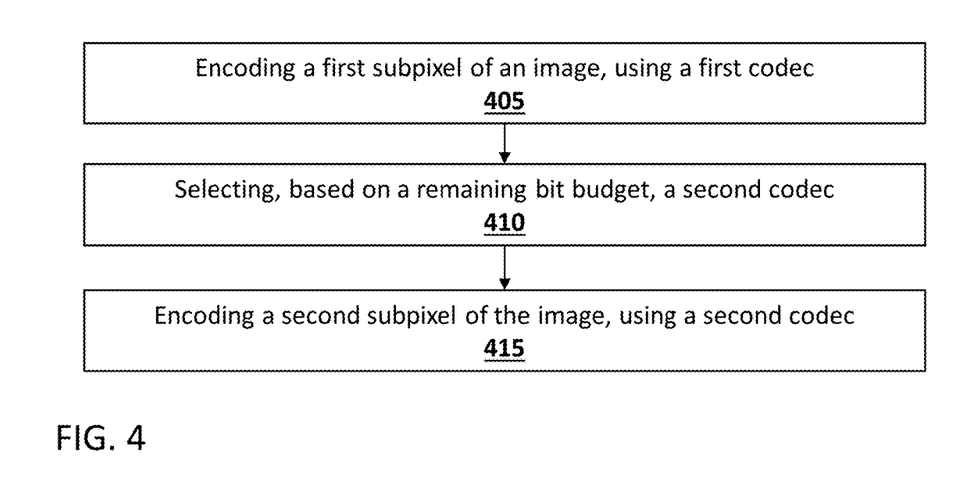
FIG. 4 is a flow chart of a method, according to an embodiment of the present disclosure.

FIG. 4 is a flowchart of a method, in some embodiments. The method includes, encoding, at 405, a first subpixel of an image, using a first codec; selecting, at 410, based on a remaining bit budget, a second codec; and encoding, at 415, a second subpixel, immediately following the first subpixel, using the second codec. The first codec may have a first loss, according to a measure of loss, and the second codec may have a second loss, according to the measure of loss, the second loss being greater than zero and less than the first loss.

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, the term "or" should be interpreted as "and/or", such that, for example, "A or B" means any one of "A" or "B" or "A and B". As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although exemplary embodiments of a system and method for encoding have been specifically described and illustrated herein, many modifications and variations will be apparent to those skilled in the art. Accordingly, it is to be understood that a system and method for encoding constructed according to principles of this disclosure may be embodied other than as specifically described herein. The invention is also defined in the following claims, and equivalents thereof.

What is claimed is:

1. A method, comprising:
   encoding a first pixel of an image using a first lossy codec, wherein the first lossy codec has a first number of remaining bits per subpixel;
   selecting, based on a remaining bit budget, a second lossy codec, wherein the second lossy codec has a second number of remaining bits per subpixel;
   encoding a second pixel, immediately following the first pixel, using the second lossy codec,
   wherein:
      the first lossy codec has a first loss, according to a measure of loss;
      the second lossy codec has a second loss, according to the measure of loss, the second loss being greater than zero and less than the first loss; and
      the first number is greater than the second number.

2. The method of claim 1, further comprising storing a result of the encoding of the first pixel in a buffer, wherein the remaining bit budget is a number of free bits in the buffer after the storing of the result, less a reserve amount.

3. The method of claim 1, wherein the selecting of the second lossy codec comprises determining that an estimated number of bits required to encode remaining pixels of the image using the second lossy codec is greater than or equal to the remaining bit budget.

4. The method of claim 3, wherein:
   the selecting of the second lossy codec comprises determining that the estimated number of bits required to encode the remaining pixels of the image using a third codec is less than the remaining bit budget; and
   the third codec has a third loss, according to the measure of loss, the third loss being greater than the second loss.

5. The method of claim 3, further comprising encoding a third pixel using a fourth codec, wherein the fourth codec has a fourth loss, according to the measure of loss, the fourth loss being greater than the first loss.

6. The method of claim 1, wherein the measure of loss is a maximum loss.

7. The method of claim 1, wherein the measure of loss is an average loss.

8. A method, comprising:
   encoding a first pixel of an image using a first lossy codec, wherein the first lossy codec has a first number of remaining bits per subpixel;
   encoding a second pixel of the image using a second lossy codec, wherein the second lossy codec has a second number of remaining bits per subpixel;
   selecting, based on a remaining bit budget, a third lossy codec;
   encoding a third pixel, immediately following the second pixel, using the third lossy codec,
   wherein:
      the first lossy codec has a first loss, according to a measure of loss;
      the second lossy codec has a second loss, according to the measure of loss;
      the third lossy codec has a third loss, according to the measure of loss;
      the second loss is greater than zero;
      the first loss is greater than the second loss;
      the third loss is greater than the first loss; and
      the first number is greater than the second number.

9. The method of claim 8, further comprising storing a result of the encoding of the second pixel in a buffer, wherein the remaining bit budget is a number of free bits in the buffer after the storing of the result, less a reserve amount.

10. The method of claim 8, wherein the selecting of the third lossy codec comprises determining that an estimated number of bits required to encode remaining pixels of the image using the third lossy codec is greater than or equal to the remaining bit budget.

11. The method of claim 10, wherein:
the selecting of the third lossy codec comprises determining that the estimated number of bits required to encode the remaining pixels of the image using a fourth codec is less than the remaining bit budget; and
the fourth codec has a fourth loss, according to the measure of loss, the fourth loss being greater than the third loss.

12. The method of claim 10, further comprising encoding a fourth pixel using a fourth codec, wherein the fourth codec has a fourth loss, according to the measure of loss, the fourth loss being greater than the first loss.

13. The method of claim 8, wherein the measure of loss is a maximum loss.

14. The method of claim 8, wherein the measure of loss is an average loss.

15. A method, comprising:
encoding a first pixel of an image using a first lossy codec, wherein the first lossy codec has a first number of remaining bits per subpixel;
selecting, based on a remaining bit budget, a second lossy codec, wherein the second lossy codec has a second number of remaining bits per subpixel;
encoding a second pixel, immediately following the first pixel, using the second lossy codec,
wherein:
the first lossy codec has a first loss, according to a measure of loss;
the second lossy codec has a second loss, according to the measure of loss, the second loss being greater than zero and less than the first loss;
the second pixel follows the first pixel of a line of the image and precedes a last pixel of the line of the image; and
the first number is greater than the second number.

16. The method of claim 15, further comprising storing a result of the encoding of the first pixel in a buffer, wherein the remaining bit budget is a number of free bits in the buffer after the storing of the result, less a reserve amount.

17. The method of claim 15, wherein the selecting of the second lossy codec comprises determining that an estimated number of bits required to encode remaining pixels of the image using the second lossy codec is greater than or equal to the remaining bit budget.

18. The method of claim 17, wherein:
the selecting of the second lossy codec comprises determining that the estimated number of bits required to encode the remaining pixels of the image using a third codec is less than the remaining bit budget; and
the third codec has a third loss, according to the measure of loss, the third loss being greater than the second loss.

19. The method of claim 17, further comprising encoding a third pixel using a fourth codec, wherein the fourth codec has a fourth loss, according to the measure of loss, the fourth loss being greater than the first loss.

20. The method of claim 15, wherein the measure of loss is a maximum loss.

* * * * *